United States Patent Office
3,639,468
Patented Feb. 1, 1972

3,639,468
PROCESS FOR PREPARING AMPHOTERIC
SURFACE ACTIVE AGENTS
Noburo Hayashi, Mamoru Katsumi, Yuzuru Ogata, Sumio Arai, Yoshiaki Kurita, and Yoshihiro Inamori, Wakayama-shi, Japan, assignors to Kao Soap Co., Ltd., Tokyo, Japan
No Drawing. Filed July 30, 1968, Ser. No. 748,633
Claims priority, application Japan, Nov. 1, 1967, 42/49,391
Int. Cl. C07c 101/20, 101/30
U.S. Cl. 260—534 E
6 Claims

ABSTRACT OF THE DISCLOSURE

A process for preparing N-alkyl N-hydroxyethyl-$\beta$-aminoethoxyacetic acid or N-alkyl N,N-bis (ethoxyacetic acid) in which a diethanolalkylamine is reacted with monochloracetic acid or its alkali metal salts, either
(1) In a substantially anhydrous condition after substituting the active hydrogen of the diethanolalkylamine with an alkali metal, or
(2) In the presence of a caustic alkali in an amount sufficient to neutralize the generated HCl in a substantially anhydrous condition.

BACKGROUND OF THE INVENTION

Field of the invention

This invention relates to a process for preparing novel amphoteric surface active agents which can reduce the irritation to human skin and increase the detergency of anionic surface active agents when they are incorporated in a washing agent composition.

DESCRIPTION OF THE PRIOR ART

It is known that, from the reaction of diethanolalkylamines with monochloracetates, an N-alkyl N,N-diethanol-$\alpha$-betaine will be produced. (For example, S. Komori et al.: Kogyo Kagaku Zasshi 60 (7) 908–914 (1957).) But no method is known for preparing a N-alkyl N-hydroxyethyl-$\beta$-aminoethoxyacetic acid or N-alkyl N,N-bis (ethoxyacetic acid) while inhibiting the formation of betaine.

The N-alkyl N,N-diethanol-$\alpha$-betaines, well-known amphoteric surface active agents, have been used with anionic surface active agents such as alkylbenzenesulfonate, sodium alkyl sulfate and sodium polyoxyethylene-alkyl-ether-sulfate in order to prepare a detergent composition which is low in the irritation to human skin, but the irritation reducing effect was not sufficient. It has now been discovered that N-alkyl N-hydroxyethyl-$\beta$-aminoethoxyacetic acid and (or) N-alkyl N,N-bis (ethoxyacetic acid) (including their alkali metal salts) which can be obtained according to the process of the present invention are far more effective in reducing irritation to human skin and increasing the detergency of anionic surface active agents.

These amphoteric surface active agents according to the present invention can be represented by the following general formula:

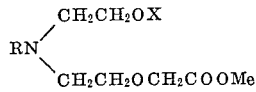

wherein R is an alkyl group having from 12 to 18 carbon atoms, Me is an alkali metal or hydrogen and X is hydrogen or $CH_2COOMe$.

The present invention relates to a method for preparing an N-alkyl N-hydroxyethyl-$\beta$-aminoethoxyacetic acid and N-alkyl N,N-bis (ethoxyacetic acid) or their mixtures by inhibiting a betainating reaction in the reaction of diethanolalkylamine with monochloracetate.

SUMMARY OF THE INVENTION

According to the present invention, a diethanolalkylamine is made to react with monochloracetic acid or its salt (sodium or potassium salt), (1) in a substantially anhydrous condition after substituting the active hydrogen of the said diethanolalkylamine with an alkali metal such as potassium and sodium in advance, by reacting the said diethanolalkylamine with (a) an alkali metal such as metallic potassium or metallic sodium, or (b) an alkali alkoxide such as potassium methoxide or sodium methoxide or (c) a caustic alkali such as caustic soda or caustic potash, or (2) in the presence of caustic alkali, such as caustic soda or caustic potash, in a sufficient amount to neutralize the generated HCl in a substantially anhydrous condition and the desired product according to the present invention as is mentioned above will be obtained while inhibiting the production of a betainate.

The above-mentioned reaction can be conducted in the presence or absence of an inert solvent, such as toluene.

The present invention has been accomplished on the basis of our discovery that the type of reaction between a diethanolalkylamine and monochloracetic acid or its salt in the presence of an alkali will be markedly different depending on the amount of water present in the reaction system. When the amount of water is large, the betainating reaction will be predominant. But, when the amount of water is small, the carboxymethylating reaction will be predominant. According to the present invention, the ratio of the betaine in the reaction product can be made less than 10% and the ratio of the desired carboxymethylate can be made more than 50%.

The reaction mixture obtained by the process of the present invention can be used in a washing agent or detergent composition as it is or after it has been purified to obtain the respective carboxymethylates or their mixture, but it will have generally the following composition ranges:

|  | Percent |
| --- | --- |
| N-alkyl N,N,-diethanol betaine | 0–5 |
| N-alkyl N,N-bis (sodium ethoxyacetate) | 50–100 |
| Sodium N-alkyl N-hydroxyethyl-$\beta$-aminoethoxyacetate | 0–20 |
| Diethanolalkylamine | 0–50 |

Further, the reaction product according to the present invention (or the purified carboxymethylate mixture) and the anionic surface active agent should be contained in a detergent composition in a ratio of 5–40 parts by weight of the former and 95–60 parts by weight of the latter.

A diethanolalkylamine having an alkyl group of 12 to 18 carbon atoms is suitable to use in the reaction of the present invention. The above alkyl group of the diethanolalkylamine includes lauryl, tridecyl, myristyl, pentadecyl, palmityl, margaryl, stearyl and oleyl.

In carrying out the present invention, monochloracetic acid, or its sodium or potassium salt, may be made to react on a diethanolalkylamine at a mol ratio of more than 1 or preferably 1.5:1 to 2.5:1 at a reaction temperature of 60 to 150° C., preferably 80 to 100° C., after the active hydrogen of the diethanolalkylamine has been substituted with an alkali metal, alkali alkoxide or caustic alkali in advance or in the presence of a caustic alkali of a sufficient amount to neutralize the generated HCl in a substantially anhydrous condition.

DESCRIPTION OF THE PREFERRED EMBODIMENTS

Examples embodying the process of the present invention and comparative examples (controls) shall be shown in the following:

Example 1

6950 g. of distilled diethanollaurylamine were put into a kneader having ribbon-shaped stirring blades, 2400 g. of powdered caustic soda were added thereto while blowing in nitrogen gas and the contents were stirred at 90 to 100° C. for 1 hour. Then 7000 g. of sodium monochloracetate were added thereto as a powder with stirring over a period of 1 hour while the contents were being slightly cooled so as to be at a temperature of 80 to 90° C. After the sodium monochloracetate was thus added, the contents were further stirred at 90 to 100° C. for 1 hour. A part of the reaction product was dissolved in ethanol in an amount 5 times as large, insolubles were removed by filtration, the ethanol was distilled away and the composition of the product was determined. As a result, the composition of the product was as follows: (All percentages are by weight here and in the following examples.)

|  | Percent |
|---|---|
| N-lauryl N,N-diethanolbetaine | 2.0 |
| N-lauryl N,N-bis (sodium ethoxyacetate) | 62.3 |
| Sodium N-alkyl N-hydroxyethyl β-aminoethoxyacetate | 5.3 |
| Diethanollaurylamine | 23.6 |

In the analyses of the above-mentioned composition, the product was divided with an anion exchange resin into an adsorbed part and a nonadsorbed part. The adsorbed part, after it was converted into its methyl ester, and the nonadsorbed part, as it was, were respectively isolated and quantitatively determined by a thin layer chromatography. The structure was determined by infrared absorption spectrum and mass spectrum measurements.

For example, the structure of N-lauryl N,N-bis (sodium ethoxyacetate) was determined as follows: The reaction product was treated with an anion exchange resin after removing therefrom inorganic impurities such as NaCl formed in the reaction by such means as recrystallization and solvent fractionation. The adsorbed part on the anion exchange resin (developed by 0.1 N NaOH solution) was converted to its methyl ester and then it was developed by thin layer chromatography, which gave two spots. The component having a larger Rf was stripped off the thin layer and extracted by ethyl acetate.

The infrared absorption spectrum and mass spectrum of the extracted sample were observed. The infrared spectrum did not show the absorption of OH and the mass spectrum showed strong peaks at m/e=358, 314, 262. Further, the element analysis of the Na salt of said component was conducted, which gave the following results:

Measured (percent): C, 53.3; H, 8.5; N, 3.3; Na, 10.2.
Calculated (percent):[1] C, 55.4; H, 8.5; N, 3.2; Na, 10.6.

Thus, the structure of said component has been determined as N-lauryl N,N-bis (sodium ethoxyacetate).

7 parts of sodium polyoxyethylenelaurylsulfate were mixed with 3 parts of the obtained product and a dish washing test was made at 40° C. by using a solution of 0.05% of the mixture by the method mentioned in J. Am. Oil Chem. Soc. 32, 437 (1955). As a result, it was found that, when the product obtained by the process of the present invention was not added, the detergency was 4 plates and the foaming force was 5 plates and that, when it was added, the detergency increased to be 6 plates and the foaming force increased to be 8 plates. Further, in a hand dipping test at 40° C. in 0.1% solution, it was recognized that, when the product according to the present invention was added, skin irritation was reduced.

Controls 1 to 3

(1) 57.6 g. of distilled diethanollaurylamine, 9.6 g. of caustic soda, 54 g. of water and 28 g. of sodium monochloracetate were put into a four-necked flask of a capacity of 300 cc. and were stirred at 95° C. for 3 hours. 20 g. of the reaction product were neutralized with hydrochloric acid, 200 cc. of ethanol were added thereto, insolubles were separated by filtration, the filtrate was concentrated and its composition was analyzed. The results were as follows:

|  | Percent |
|---|---|
| N-lauryl N,N-diethanollaurylbetaine | 15.6 |
| Sodium N-lauryl N-hydroxyethyl β-aminoethoxyacetate and N-lauryl N,N-bis (sodium ethoxyacetate) | 3.5 |
| Diethanollaurylamine | 65.0 |

(2) 57.6 g. of distilled diethanollaurylamine and 28 g. of sodium monochloracetate were put into a four-necked flask of a capacity of 200 cc. and were stirred at 100° C. for 3 hours. 200 cc. of ethanol were added to 20 g. of the reaction product, insolubles were separated by filtration, the filtrate was concentrated and its composition was determined. The results were found to be as follows:

|  | Percent |
|---|---|
| N-lauryl N,N-diethanollaurylbetaine | 54.9 |
| Sodium N-lauryl N-hydroxyethyl β-aminoethoxyacetate | 2.8 |
| Diethanollaurylamine | 38.1 |

(3) 57.6 g. of distilled diethanollaurylamine, 33.3 g. of sodium monochloracetate and 18 g. of water were put into a four-necked flask of a capacity of 200 cc. and were stirred at 95 to 100° C. for 3 hours. 200 cc. of ethanol were added to 20 g. of the reaction product, insolubles were separated by filtration, the filtrate was concentrated and then its composition was determined. As a result, the composition was found to be as follows:

|  | Percent |
|---|---|
| N-lauryl N,N-diethanollaurylbetaine | 26.7 |
| Sodium N-lauryl N-hydroxyethyl β-aminoethoxyacetate and N-lauryl N,N-bis (sodium ethoxyacetate) | 3.1 |
| Diethanollaurylamine | 50.7 |

The above-mentioned reaction (1) was one in which water and an alkali were present in the reaction system, (2) was one in which water and an alkali were not present in the reaction system and (3) was one in which water was present but no alkali was present in the reaction system. It is seen that, in these cases, the carboxymethylate of the present invention was not substantially produced.

Example 2

91 g. of distilled lauryldiethanolamine, 32 g. of caustic soda and 500 g. of xylene were put into a four-necked flask of a capacity of 1 liter provided with a thermometer, a stirrer and a condenser and water was distilled out under the boiling of the xylene at 140° C. for 8 hours. The water thus distilled out was 10.5 g. Then the contents were cooled to 30° C., 93.5 g. of sodium monochloracetate were added thereto and they were stirred at 80° C. for 2 hours. The part insoluble in xylene was filtered off and then xylene was removed. The total of the contents of sodium N-lauryl N-hydroxyethyl β-aminoethoxyacetate and N-lauryl N,N-bis (sodium ethoxyacetate) was 65%.

Example 3

42 g. of a methanol solution of 40% potassium methoxide and 100 g. of toluene were added to 36.3 g. of distilled stearyldiethanolamine. The methanol and toluene were distilled off. Again 100 g. of toluene were added thereto and 31.6 g. of potassium monochloracetate were added thereto under stirring. The mixture was stirred at 90° C. for 2 hours.

300 g. of ethanol were added to the reaction product, insolubles were removed and then the ethanol was distilled off. The total of the contents of potassium N-lauryl N-hydroxyethyl β-aminoethoxyacetate and N-lauryl N,N-bis (potassium ethoxyacetate) in the product was 58.5%.

---

[1] As N-lauryl N,N-bis (sodium ethoxyacetate).

Example 4

55.2 g. of distilled lauryldiethanolamine was added to 38.4 g. of powdery caustic soda and stirred at 95° C. for 2 hours in a nitrogen atmosphere. Then 45.2 g. of monochloracetic acid were gradually added thereto over a period of about 15 minutes. After the addition, the mixture was stirred at 95° C. for 2 hours. After the reaction, ethanol was added thereto, the insoluble part was filtered away and the ethanol was distilled away. The total of the contents of sodium N-lauryl N-hydroxyethyl β-aminoethoxyacetate and N-lauryl N,N-bis (sodium ethoxyacetate) in the product was 52.8%, whereas N-lauryl N,N-diethanolbetaine was only 2.5%.

Example 5

120 g. of toluene were added to 70 g. of distilled diethanolstearylamine. 7.8 g. of metallic potassium were gradually added to the mixture during 15 minutes while warming it at 40° C. When the mixture was stirred at 50 to 90° C. for 2 hours, the metallic potassium dissolved. Then 28 g. of sodium monochloracetate were added thereto at 95 to 100° C. and the mixture was stirred for 2 hours. 500 cc. of ethanol were added thereto and the mixture was filtered. The filtrate was concentrated. Sodium N-lauryl N-hydroxyethyl β-aminoethoxyacetate and N-lauryl N,N-bis (sodium ethoxyacetate) in the reaction product were 54.5%.

The embodiments of the invention in which an exclusive property or privilege is claimed are defined as follows:

1. A process for preparing an amphoteric surface active agent composed of an N-alkyl (or N-oleyl) N-hydroxyethyl β-aminoethoxyacetic acid and/or an N-alkyl (or N-oleyl) N,N-bis (ethoxyacetic acid) which comprises reacting, under substantially anhydrous conditions, (A) a diethanolalkylamine wherein the alkyl radical contains 12 to 18 carbon atoms, or diethanololeylamine with (B) monochloracetic acid or its alkali metal salt, (1) after having substituted the active hydrogen of said diethanolalkylamine or diethanololylamine with an alkali metal in advance or (2) in the presence of a caustic alkali in an amount sufficient to neutralize the HCl which will be generated in the reaction.

2. The process as claimed in claim 1, wherein said alkali metal is selected from the group consisting of sodium and potassium.

3. The process as claimed in claim 2, wherein said caustic alkali is selected from the group consisting of caustic soda and caustic potash.

4. The process as claimed in claim 1, wherein said alkyl radical is selected from the group consisting of lauryl, tridecyl, myristyl, pentadecyl, palmityl, margaryl, and stearyl.

5. The process as claimed in claim 1, wherein monochloracetic acid or its sodium or potassium salt is made to react on diethanolalkyl (or oleyl) amine at a mol ratio of more than 1 at a reaction temperature of 60 to 150° C.

6. The process as claimed in claim 1, wherein monochloracetic acid or its sodium or potassium salt is made to react on diethanolalkyl (or oleyl) amine at a mol ratio of 1.5:1 to 2.5:1 at a reaction temperature of 80 to 100° C.

References Cited

UNITED STATES PATENTS

Re. 22,352   7/1943   Teeters et al. _____ 260—534 E

OTHER REFERENCES

Journal of American Chemical Society, vol. 67, p. 2272, (1945), Wright et al.

Reactions of Organic Compounds, W. J. Hickinbottom, pp. 90–91.

LORRAINE A. WEINBERGER, Primary Examiner

J. L. DAVISON, Assistant Examiner

U.S. Cl. X.R.

260—534 M